United States Patent
Nakamura et al.

(10) Patent No.: US 12,240,352 B2
(45) Date of Patent: Mar. 4, 2025

(54) CONTROL METHOD FOR ELECTRIC VEHICLE AND CONTROL DEVICE FOR ELECTRIC VEHICLE

(71) Applicant: NISSAN MOTOR CO., LTD., Yokohama (JP)

(72) Inventors: Katsunori Nakamura, Kanagawa (JP); Akira Sawada, Kanagawa (JP); Takashi Nakajima, Kanagawa (JP); Kengo Fujiwara, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 349 days.

(21) Appl. No.: 17/771,213

(22) PCT Filed: Oct. 28, 2019

(86) PCT No.: PCT/JP2019/042132
§ 371 (c)(1),
(2) Date: Apr. 22, 2022

(87) PCT Pub. No.: WO2021/084574
PCT Pub. Date: May 6, 2021

(65) Prior Publication Data
US 2022/0379732 A1    Dec. 1, 2022

(51) Int. Cl.
*B60L 7/18* (2006.01)
*B60L 7/14* (2006.01)
*B60L 15/20* (2006.01)

(52) U.S. Cl.
CPC .................. *B60L 7/18* (2013.01); *B60L 7/14* (2013.01); *B60L 15/2009* (2013.01); *B60L 2240/12* (2013.01); *B60L 2240/423* (2013.01)

(58) Field of Classification Search
None
See application file for complete search history.

(56) References Cited

U.S. PATENT DOCUMENTS

2015/0019057 A1    1/2015    Morisaki et al.
2016/0264003 A1*   9/2016    Yokoyama .......... B60L 15/2009
(Continued)

FOREIGN PATENT DOCUMENTS

EP    3 342 625 A1    7/2018
JP    2000-177428 A   6/2000
(Continued)

*Primary Examiner* — David P. Merlino
*Assistant Examiner* — Mahmoud M Kazimi
(74) *Attorney, Agent, or Firm* — Foley & Lardner LLP

(57) ABSTRACT

A control method for an electric vehicle using a motor as a traveling drive source to decelerate by a regenerative braking force of the motor, including: obtaining an accelerator operation amount; estimating a disturbance torque acting on a vehicle body of the electric vehicle; obtaining an angular velocity of a rotating body that correlates to a rotation speed of a drive shaft which drives the electric vehicle; calculating a first torque command value based on the accelerator operation amount; setting the first torque command value to a torque command value; controlling a torque generated in the motor based on the torque command value; setting a target stop position at the time of stopping the electric vehicle; calculating a target angular velocity of the rotating body according to a distance from the electric vehicle to the target stop position; calculating a second torque command value for stopping the electric vehicle at the target stop position based on a difference between the target angular velocity and the obtained angular velocity; and converging the torque command value to the disturbance torque by setting the second torque command value to the torque command value and adjusting the braking and driving forces of the motor according to a distance to the target stop position, when the accelerator operation amount decreases or becomes zero and the electric vehicle is about to stop.

11 Claims, 12 Drawing Sheets

(56) References Cited

U.S. PATENT DOCUMENTS

| 2017/0015203 | A1* | 1/2017 | Oguri | B60L 50/62 |
| 2018/0015840 | A1* | 1/2018 | Sawada | B60L 15/2009 |
| 2018/0244158 | A1* | 8/2018 | Komatsu | B60W 10/18 |

FOREIGN PATENT DOCUMENTS

| JP | 2005-231588 A | 9/2005 |
| JP | 2015-019521 A | 1/2015 |
| JP | 2015-133799 A | 7/2015 |
| JP | 2017-175853 A | 9/2017 |

\* cited by examiner

CONTROL METHOD FOR ELECTRIC VEHICLE AND CONTROL DEVICE FOR ELECTRIC VEHICLE

TECHNICAL FIELD

The present invention relates to a control method for an electric vehicle and a control device for an electric vehicle.

BACKGROUND ART

JP2015-133799A discloses a control device for an electric vehicle, which executes a stop control that generates a torque to stop the vehicle by a motor when an accelerator operation amount decreases or becomes zero and the electric vehicle is about to stop.

SUMMARY OF INVENTION

In the above-mentioned stop control, the vehicle can be stopped even on a sloped road by controlling to estimate the disturbance torque applied to the motor and converge the torque generated by the motor to the estimated disturbance torque. However, since the above-mentioned stop control does not consider the possibility that a preceding vehicle exists in front of a host vehicle, when the preceding vehicle may, for example, has a larger deceleration than the host vehicle, the host vehicle may get too close to the preceding vehicle depending on the state of the preceding vehicle.

The object of the present invention is to provide a technique capable of stopping a host vehicle at an appropriate position when a preceding vehicle exists in front of the own vehicle regardless of the state of the preceding vehicle.

One aspect of the present invention is a control method for an electric vehicle using a motor as a traveling drive source to decelerate by a regenerative braking force of the motor. The control method includes: obtaining an accelerator operation amount; estimating a disturbance torque acting on a vehicle body of the electric vehicle; obtaining an angular velocity of a rotating body that correlates to a rotation speed of a drive shaft which drives the electric vehicle; calculating a first torque command value based on the accelerator operation amount; setting the first torque command value to a torque command value; controlling a torque generated in the motor based on the torque command value; setting a target stop position at the time of stopping the electric vehicle; calculating a target angular velocity of the rotating body according to a distance from the electric vehicle to the target stop position; calculating a second torque command value for stopping the electric vehicle at the target stop position based on a difference between the target angular velocity and the obtained angular velocity; and converging the torque command value to the disturbance torque by setting the second torque command value to the torque command value and adjusting the braking and driving forces of the motor according to a distance to the target stop position, when the accelerator operation amount decreases or becomes zero and the electric vehicle is about to stop.

Embodiments of the present invention will be described in detail below with the accompanying drawings.

DESCRIPTION OF EMBODIMENTS

Embodiments of the present invention will be described below with reference to the accompanying drawings.

First Embodiment

Figure 1:
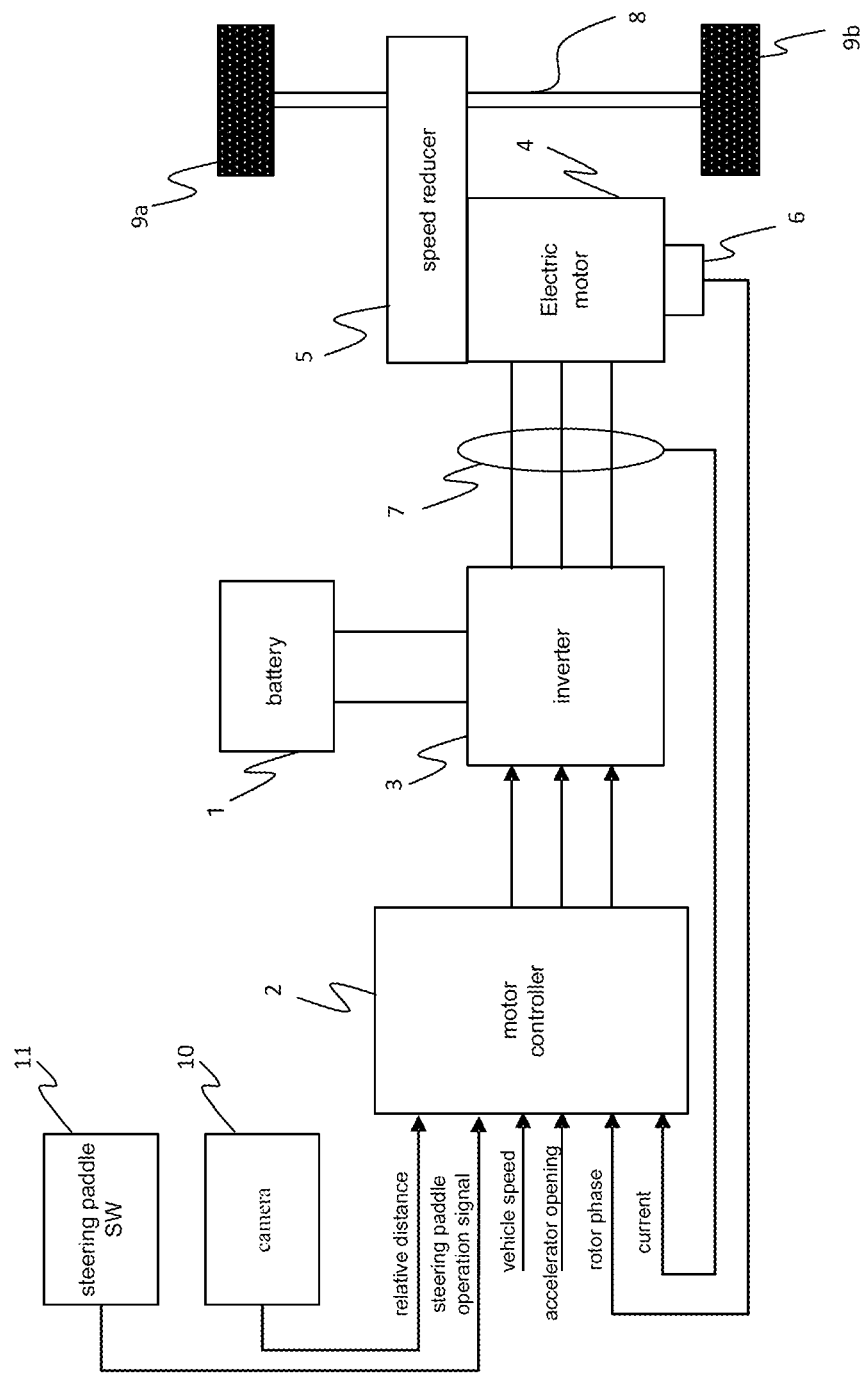
FIG. 1 is a block diagram illustrating a main configuration of an electric vehicle including a control device for an electric vehicle according to an embodiment.

FIG. 1 is a block diagram illustrating an example of a main configuration of an electric vehicle including a control device for an electric vehicle according to the first embodiment.

The control device for the electric vehicle according to this embodiment includes an electric motor 4 (hereinafter simply referred to as motor 4) as a part or all of a drive source for the vehicle and is applicable to an electric vehicle that can travel by a driving force of the motor 4. The electric vehicle includes not only electric automobile, but also hybrid automobile and fuel-cell automobile.

The control device for the electric vehicle illustrated in FIG. 1 controls acceleration and deceleration or stop of the vehicle only by operation of an accelerator pedal. At the time of acceleration, a driver in the electric vehicle depresses the accelerator pedal, and at the time of deceleration or stop, the driver reduces the depression amount of the depressed accelerator pedal or operates the depression amount of the accelerator pedal to zero. Note that, on an ascending road, the vehicle may approach a stop state with the accelerator pedal being depressed in order to prevent a backward motion of the vehicle.

Signals indicative of a vehicle state such as a vehicle speed V, an accelerator opening θ, a rotor phase α of the motor 4, and currents iu, iv, iw of the motor 4, and a relative distance or a steering paddle operation signal to be described later are input into a motor controller 2 as digital signals. Then, the motor controller 2 generates a PWM signal for controlling the power supplied to the motor 4 based on the input signals, and supplies the generated PWM signal to an inverter 3 to control to open or close the switching element of the inverter 3.

The inverter 3, for example, turns on/off two switching elements (for example, power semiconductor elements such as IGBT or MOS-FET) for each phase so as to convert a direct current supplied from a battery 1 into an alternating current and introduces a desired current into the motor 4.

The motor 4 is realized by, for example, a three-phase alternating current motor. The motor 4 generates a driving force using the alternating current output from the inverter 3, and transmits the driving force to left and right drive wheels 9a and 9b via a speed reducer 5 and a drive shaft 8. Further, when the motor 4 rotates following the driving wheels 9a, 9b while the electric vehicle travels, the motor 4 generates a regenerative driving force so as to recover a kinetic energy of the electric vehicle as an electric energy. In this case, the inverter 3 converts an alternating current generated at the time of a regenerative operation of the motor 4 into a direct current and supplies it to the battery 1.

A rotation sensor 6, for example, is realized by a resolver or an encoder, and detects a rotor phase α of the motor 4.

A current sensor 7 detects the three-phase alternating currents iu, iv, iw supplied to the motor 4. It should be noted that, since the sum of the three-phase alternating currents iu, iv and iw is 0 (zero), the currents of any two phases may be detected and the current of the remaining one phase may be obtained by calculation.

The camera 10 is configured to be able to image the traveling direction of the vehicle, and measures the relative distance between a vehicle or an obstacle existing in the traveling direction and the host vehicle. However, the camera 10 is an example, and configuration is not limited to this. Instead of the camera 10, a sensor or radar capable of measuring the relative distance between the host vehicle and the vehicle or the obstacle existing in the traveling direction may be used. Further, the camera 10 may be a stereo camera. Further, the traveling direction includes not only the front of the vehicle but also the rear when the vehicle is moving backward. Therefore, in order to image the traveling direction when the vehicle moves backward, it is preferable to provide a camera capable of imaging not only the front of the vehicle but also the rear of the vehicle. In the following, the traveling direction of the vehicle is expressed as front for convenience. In addition, another vehicle existing in the traveling direction of the vehicle is hereinafter referred to as a vehicle ahead.

The steering paddle SW 11 detects the operation of the steering paddle by the driver.

Figure 2:
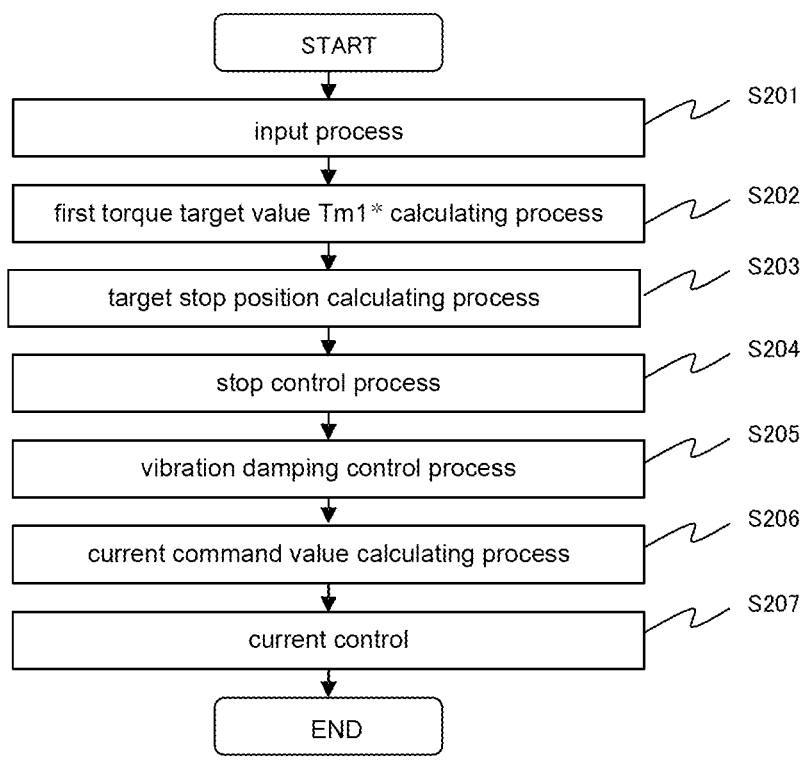
FIG. 2 is a procedure of a process of a motor current control performed by a motor controller included in the control device for electric vehicle according to an embodiment.

FIG. 2 is a flowchart illustrating a procedure of a process of a motor current control performed by the motor controller 2.

In Step S201, a signal indicating the operating state of the electric vehicle is input into the motor controller 2. The operating state here means the direct current voltage value Vdc (V) between the battery 1 and the inverter 3, the vehicle speed V (km/h) of the electric vehicle, the accelerator opening AP (%), the rotor phase α (rad) of the motor 4, the rotation speed Nm (rpm) of the motor 4, and the three-phase alternating current values iu, iv and iw supplied to the motor 4 and the steering paddle operation signal, etc. In addition, the relative distance required for the control calculation related to the target stop position calculating process to be described later is input into the motor controller 2.

The vehicle speed V (km/h) is obtained from an unillustrated vehicle speed sensor or from another controller via communication. Alternatively, the motor controller 2 calculates the vehicle speed v (m/s) by multiplying the rotor mechanical angular velocity ωm by the tire dynamic radius R and dividing by the gear ratio of the final gear, and converts the unit by multiplying the vehicle speed v (m/s) by 3600/1000 to obtain the vehicle speed V (km/h).

The accelerator opening AP (%) is obtained from an unillustrated accelerator opening sensor or is obtained from another controller such as an unillustrated vehicle controller via communication.

The rotor phase α (rad) of the motor 4 is obtained from the rotation sensor 6. The rotation speed Nm (rpm) of the motor 4 is calculated by multiplying the motor rotation speed ωm (rad/s), which is the mechanical angular velocity of the motor 4, by 60/(2π). The motor rotation speed ωm (rad/s) is obtained by dividing the rotor angular velocity ω (electrical angle) by the number of pole pairs p in the motor 4. The rotor angular velocity ω is obtained by differentiating the rotor phase α.

The currents iu, iv, iw (A) flowing through the motor 4 are obtained from the current sensor 7.

The direct current voltage value Vdc (V) is obtained from a voltage sensor (unillustrated) provided in the direct current power supply line between the battery 1 and the inverter 3, or can be obtained from the power supply voltage value transmitted by the battery controller (unillustrated).

The measured value measured by the camera 10 is obtained as the relative distance. Alternatively, the relative distance may be obtained via communication from an unillustrated vehicle controller or another controller. Further, the relative distance may be measured using GPS, radar, distance sensor, vehicle-to-vehicle communication with the vehicle ahead, road-to-vehicle communication, or the like.

The steering paddle operation signal may be obtained from the steering paddle SW signal, or may be obtained via communication from an unillustrated vehicle controller or another controller.

In Step S202, the motor controller 2 sets the first torque target value Tm1*. Specifically, the motor controller 2 sets the first torque target value Tm1* by referring to, for example, the accelerator opening-torque table based on the accelerator opening AP and the motor rotation speed ωm input in Step S201.

Figure 3:
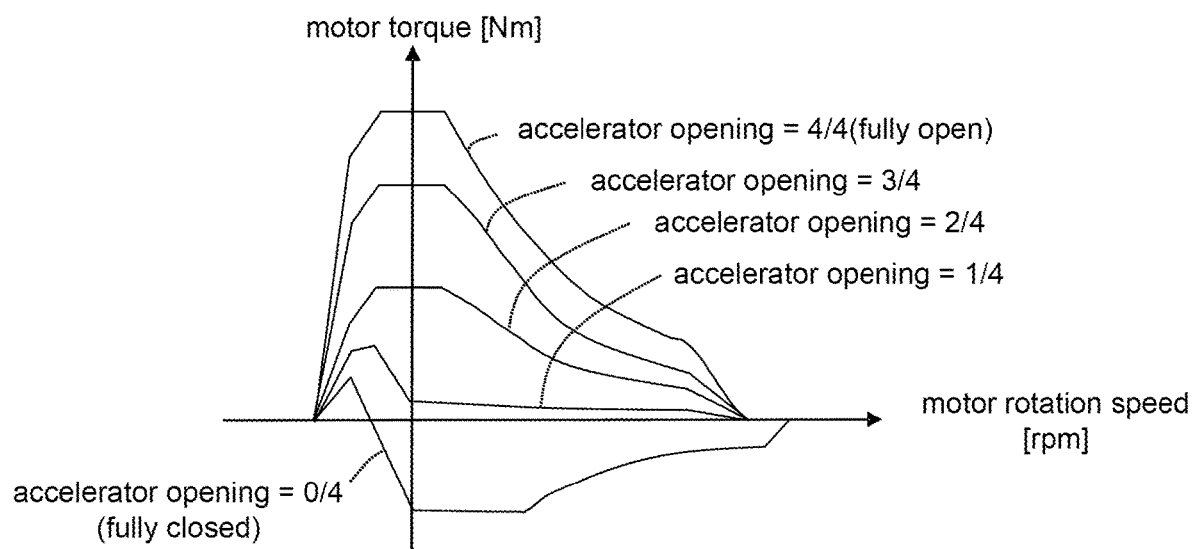
FIG. 3 is a diagram illustrating one example of an accelerator opening-torque table.

For example, in the accelerator opening-torque table illustrated in FIG. 3, a motor torque is set so that the amount of motor regeneration becomes large when the accelerator opening is 0 (fully closed). That is, when the motor rotation speed shows a positive value and at least when the accelerator opening is 0 (fully closed), a negative motor torque is set so that a regenerative braking force acts on the electric vehicle. However, the accelerator opening-torque table is not limited to the one illustrated in FIG. 3.

In Step S203, the motor controller 2 executes the target stop position calculating process. In the target stop position calculating process, the target stop position is set based on the relative distance to the vehicle ahead or the obstacle obtained from the camera 10 in Step S201 and the steering paddle operation signal. Also, whether to execute the stop position control is determined based on the accelerator opening θ and the relative distance to the vehicle ahead, and when intervening the stop position control, the stop position control start flag is set to 1. Details of the target stop position calculating process will be described later.

In Step S204, the motor controller 2 executes the stop control process. In the stop control process, the torque target value is set according to the stop position control start flag set in Step S203. When the stop position start flag is 0, the motor controller 2 sets the first torque target value Tm1* calculated in Step S202 to the third torque target value Tm3*, and when the stop position start flag is 1, the motor controller 2 sets the second torque target value Tm2*, which converges to the disturbance torque estimated value Td determined by the disturbance torque estimation means as the motor rotation speed decreases, to the third torque target value Tm3*. Further, the second torque target value Tm2* is a positive torque on an ascending road, a negative torque on a descending road, and almost zero on a flat road. Thus, a stop state of the vehicle can be maintained regardless of a gradient of a road surface. Details of the stop control process will be described later.

In Step S205, the motor controller 2 performs a vibration damping control process that suppresses the driving force transmission system vibration such as the torsional vibration of the drive shaft 8 without wasting the drive shaft torque. Specifically, the third torque target value Tm3* calculated in Step S204 and the motor rotation speed ωm are input into the motor controller 2, and the motor controller 2 calculates the sixth torque target value Tm6* that suppresses the torque transmission system vibration (such as the torsional vibration of the drive shaft 8) without sacrificing the response of the drive shaft torque. Details of the vibration damping control process will be described later.

In Step S206, the motor controller 2 obtains a d-axis current target value id* and a q-axis current target value iq* based on the sixth torque target value Tm6* calculated in Step S205, motor rotation speed ωm and direct current voltage value Vdc. For example, a table is prepared in advance, which has expressed the relation between the motor torque command value, motor rotation speed and direct current voltage value, and the d-axis current target value and the q-axis current target value through experimental results and simulation results, etc. Thus, when the motor controller 2 obtains the motor torque command value Tm*, motor rotation speed ωm and direct current voltage value Vdc, the motor controller 2 obtains the d-axis current target value id* and q-axis current target value iq* by referring to the prepared table.

In Step S207, the motor controller 2 performs a current control so that the d-axis current id and q-axis current iq match the d-axis current target value id* and q-axis current target value iq*, respectively.

Specifically, the motor controller 2 obtains the d-axis current id and q-axis current iq based on the three-phase alternating current values iu, iv and iw input in Step S201 and the rotor phase α of the motor 4. Subsequently, the motor controller 2 calculates the d-axis and q-axis voltage command values vd and vq based on the deviations between the d-axis and q-axis current target values id* and iq* and the d-axis and q-axis currents id and iq.

Further, the non-interference voltage required to cancel the interference voltage between the d-q orthogonal coordinate axes may be added to the d-axis and q-axis voltage command values vd and vq calculated by the motor controller 2.

Subsequently, the motor controller 2 obtains the PWM signals tu (%), tv (%) and tw (%) based on the d-axis and q-axis voltage command values vd and vq, the rotor phase α of the motor 4, the three-phase alternating current voltage command values vu, vv and vw, and the direct current voltage value Vdc. Since the switching element of the inverter 3 is turned ON/OFF according to the PWM signals tu, tv and tw thus obtained, the motor 4 can be driven with the desired torque indicated by the motor torque command value Tm*.

Details of the target stop position calculating process performed in Step S203 of FIG. 2 will be described below.

Figure 4:
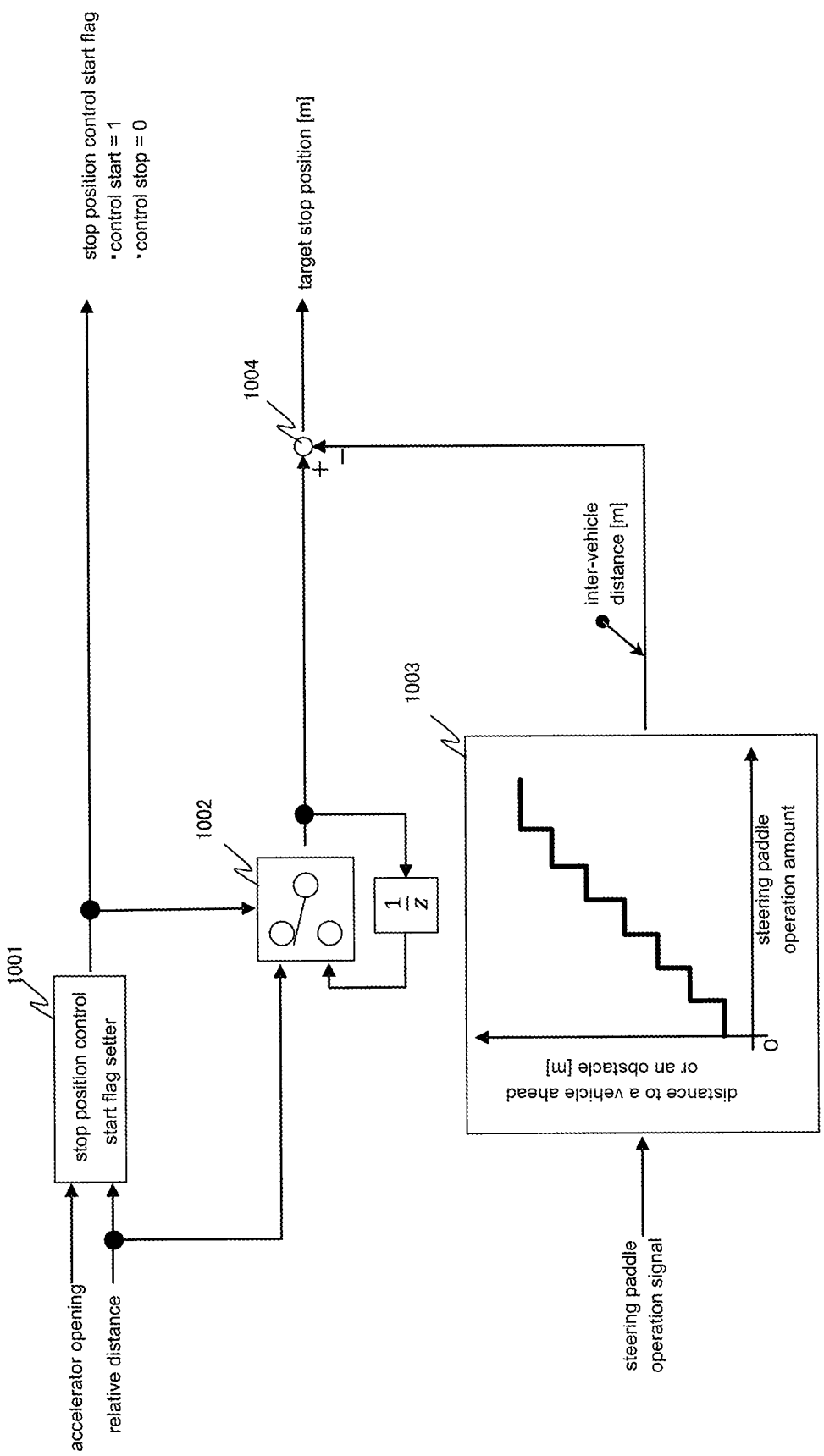
FIG. 4 is a block diagram for implementing a target stop position calculating process.

FIG. 4 is a block diagram showing an example of a functional configuration that realizes the target stop position calculating process. The target stop position calculating process of this embodiment includes a stop position control start flag setter 1001, a relative distance holder 1002, an inter-vehicle distance calculator 1003, and a subtractor 1004.

The stop position control start flag setter 1001 (hereinafter simply referred to as the flag setter 1001) executes the stop position control start flag process that sets the stop position control start flag according to the accelerator opening and the relative distance. The flag setter 1001 sets the stop position control start flag to 1 when the accelerator opening (operation amount) is zero (fully closed) and the relative distance is within a predetermined value. Further, the flag setter 1001 sets the stop position control start flag to 0 when the accelerator opening is not zero and the relative distance is equal to or more than a predetermined value. Further, the predetermined value here is a relative distance that can determine that the stop position of the host vehicle does not get too close to a vehicle ahead or an obstacle even when a conventional stop control which does not set a target stop position is executed, and the predetermined value is appropriately set to, for example, a value found in advance by an experiment or the like.

The relative distance holder 1002 holds the relative distance when the stop position control start flag set by the flag setter 1001 changes from 0 to 1. The held relative distance is output to the subtractor 1004. By holding the relative distance at such a timing, it is possible to keep a certain distance to the vehicle ahead or the obstacle and stop the vehicle.

The inter-vehicle distance calculator 1003 executes the inter-vehicle distance calculating process of changing a distance constant from a vehicle ahead or an obstacle depending on the steering paddle operation amount by the driver and calculating the relative distance target value at the time of stopping the vehicle. The distance constant is a constant for calculating the target value of the relative distance (inter-vehicle distance) between the host vehicle and a vehicle ahead or an obstacle at the time of stopping the vehicle. In this embodiment, the target value of the inter-vehicle distance at the time of stopping the vehicle can be arbitrarily changed through changing the distance constant via a steering paddle operation of the driver. FIG. 4 shows an example in which the target value of the inter-vehicle distance is set gradually larger as the operation amount of the steering paddle increases.

The subtractor 1004 calculates a target stop position by subtracting the inter-vehicle distance target value calculated by the inter-vehicle distance calculator from the relative distance calculated by the relative distance holder 1002. The calculated target stop position is output to the motor angular velocity feedback torque setter 501 as the target stop position at the time of stopping the vehicle by stop control.

Next, in explaining the stop control process performed in Step S204, first, the transmission characteristic Gp(s) from the motor torque Tm to the motor rotation speed ωm of the electric vehicle according to this embodiment will be described.

Figure 5:
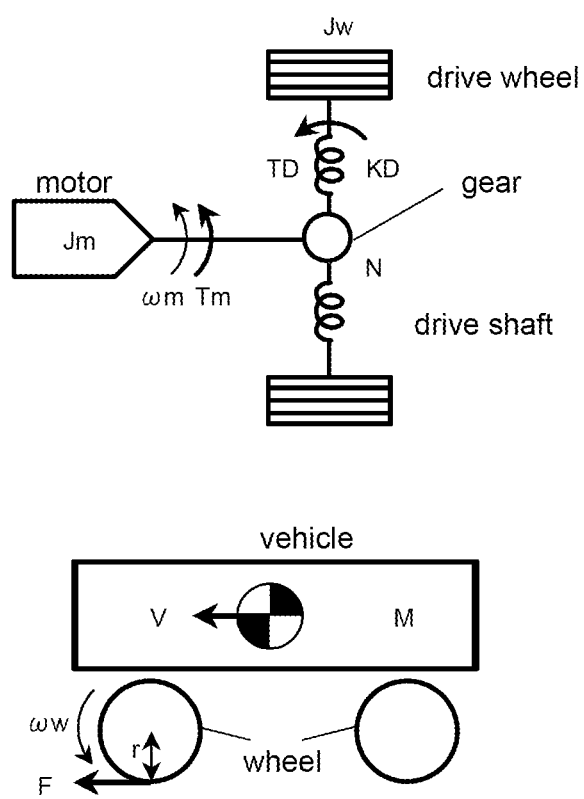
FIG. 5 is a modeled view of a driving force transmission system of a vehicle.

FIG. 5 is a modeled view of the driving force transmission system of the vehicle, and parameters in the figure are as follows.

$J_m$: inertia of motor $J_w$: inertia of drive wheel

M: mass of vehicle
$K_d$: torsional rigidity of driving system
$K_t$: coefficient of friction between tire and road surface
N: overall gear ratio
r: loaded radius of tire
$\omega_m$: motor rotation speed
$T_m^*$: motor torque command value
$T_d$: torque of drive wheel
F: force applied to vehicle (driving force)
V: speed of vehicle (vehicle body speed)
$\omega_w$: angular velocity of drive wheel Thus, the following equations of motion can be derived using the model of the driving force transmission system shown in FIG. 5.

[Equation 1]

$$J_m \cdot \omega_m = T_m^* - T_d/N \quad (1)$$

[Equation 2]

$$2J_w \cdot \omega_w = T_d - r \cdot F \quad (2)$$

[Equation 3]

$$MV = F \quad (3)$$

[Equation 4]

$$T_d = K_d \int (\omega_m/N - \omega_w) dt \quad (4)$$

[Equation 5]

$$F = K_t(r \cdot \omega_w - V) \quad (5)$$

When the transmission characteristic Gp(s), which is the transmission function of the motor 4 from the motor torque command value Tm* to the motor rotation speed ωm, is obtained based on the equations of motion expressed by the above equations (1) to (5), the transmission characteristic Gp(s) is expressed by the following equation (6).

[Equation 6]

$$G_p(s) = \frac{1}{s} \cdot \frac{b_3 s^3 + b_2 s^2 + b_1 s + b_0}{a_3 s^3 + a_2 s^2 + a_1 s + a_0} \quad (6)$$

It should be noted that each parameter in equation (6) is expressed by the following equation (7).

[Equation 7]

$$a_3 = 2J_m J_w M$$

$$a_2 = K_t J_m (2J_w + r^2 M)$$

$$a_1 = K_d M(J_m + 2J_w/N^2)$$

$$a_0 = K_d K_t (J_m + 2J_w/N^2 + r^2 M/N^2)$$

$$b_3 = 2J_w M$$

$$b_2 = K_t(2J_w + r^2 M)$$

$$b_1 = K_d M$$

$$b_0 = K_d K_t \quad (7)$$

In examining the poles and zero points of the transmission characteristic Gp(s) expressed by the above equation (6), the transmission characteristic Gp(s) can be approximated to the transmission characteristic as shown in the following equation (8), and one pole and one zero point are extremely close values. This means that α and β in the transmission characteristic Gp(s) of equation (8) are extremely close values.

[Equation 8]

$$G_p(s) = \frac{1}{s} \cdot \frac{(s+\beta) \cdot (b_2' s^2 + b_1' s + b_0')}{(s+\alpha) \cdot (s^2 + 2\zeta_p \omega_p s + \omega_p^2)} \quad (8)$$

Therefore, the vehicle model Gp(s) derived by performing the pole-zero cancellation (approximate to α=β) in the above equation (8) has a (second order)/(third order) transmission characteristic as shown in the following equation (9).

[Equation 9]

$$G_p(s) = \frac{1}{s} \cdot \frac{b_2' s^2 + b_1' s + b_0'}{s^2 + 2\zeta_p \omega_p s + \omega_p^2} \quad (9)$$

According to the vehicle model Gp(s) and the vibration damping control algorithm, the vehicle model Gp(s) of equation (9) can be regarded as the transmission characteristic Gr(s) shown in the following equation (10).

[Equation 10]

$$G_r(s) = \frac{1}{s} \cdot \frac{b_2' s^2 + b_1' s + b_0'}{s^2 + 2\omega_p s + \omega_p^2} \quad (10)$$

Next, the transmission characteristic Gpv(s) from the motor torque Tm to the vehicle body speed V will be described.

When the transmission characteristic Gpv(s) is obtained based on the above equations (1) to (5), the transmission characteristic Gpv(s) is expressed by the following equation (11).

[Equation 11]

$$G_{pV}(s) = \frac{1}{s} \cdot \frac{c_0}{a_3 s^3 + a_2 s^2 + a_1 s + a_0} \quad (11)$$

Here, each parameter in the above equation (11) is expressed by the following equation (12).

[Equation 12]

$$a_3 = 2J_m J_w M$$

$$a_2 = K_t J_m (2J_w + r^2 M)$$

$$a_1 = K_d M(J_m + 2J_w/N^2)$$

$$a_0 = K_d K_t (J_m + 2J_w/N^2 + r^2 M/N^2)$$

$$b_0 = K_d K_t$$

$$c_0 = K_d K_t r/N \quad (12)$$

When the transmission characteristic GωV(s) from the motor rotation speed ωm to the vehicle body speed V is obtained based on the above equations (8) and (11), the transmission characteristic GωV(s) is expressed by the following equation (13).

[Equation 13]

$$G_{\omega V}(s) = \frac{G_{pV}(s)}{G_p(s)} = \frac{c_0}{b_3 s^3 + b_2 s^2 + b_1 s + b_0} \quad (13)$$

Next, the transmission characteristic GpF(s) from the motor torque Tm to the driving force F of the electric vehicle will be described.

When the transmission characteristic GpF(s) is obtained based on the above equations (1) to (5), the transmission characteristic GpF(s) is expressed by the following equation (14).

[Equation 14]

$$G_{pF}(s) = \frac{c_0}{a_3 s^3 + a_2 s^2 + a_1 s + a_0} \quad (14)$$

Next, details of the stop control process performed in Step S204 of FIG. 2 will be described.

Figure 6:
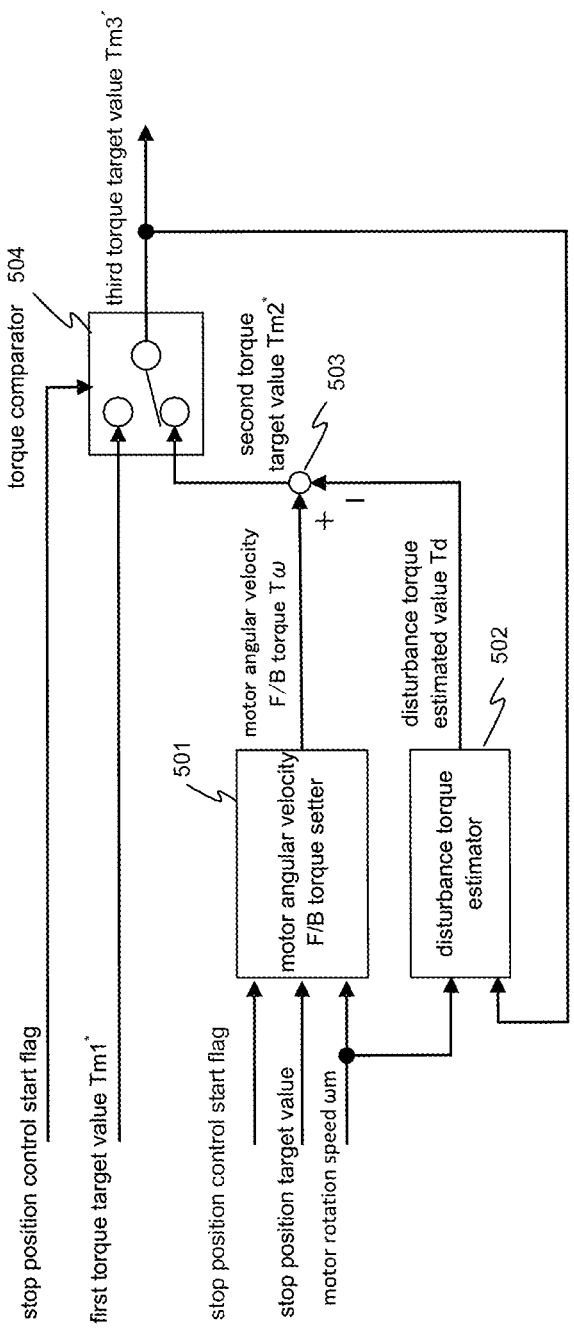
FIG. 6 is a block diagram for implementing a stop control process.

FIG. 6 is a block diagram showing an example of a functional configuration that realizes a stop control process. FIG. 6 shows the motor angular velocity F/B torque setter 501, the disturbance torque estimator 502, the subtractor 503, and the torque comparator 504 as the functional configurations that realize the stop control process.

The motor angular velocity F/B torque setter 501 calculates the motor angular velocity feedback torque Tω (hereinafter referred to as motor angular velocity F/B torque Tω) for stopping the electric vehicle using the regenerative braking force of the motor 4 based on the detected motor rotation speed ωm, the target stop position calculated in the target stop position calculating process to be described later, and the stop position control start flag set in the stop position control start flag process. Details will be described with reference to FIG. 7.

Figure 7:
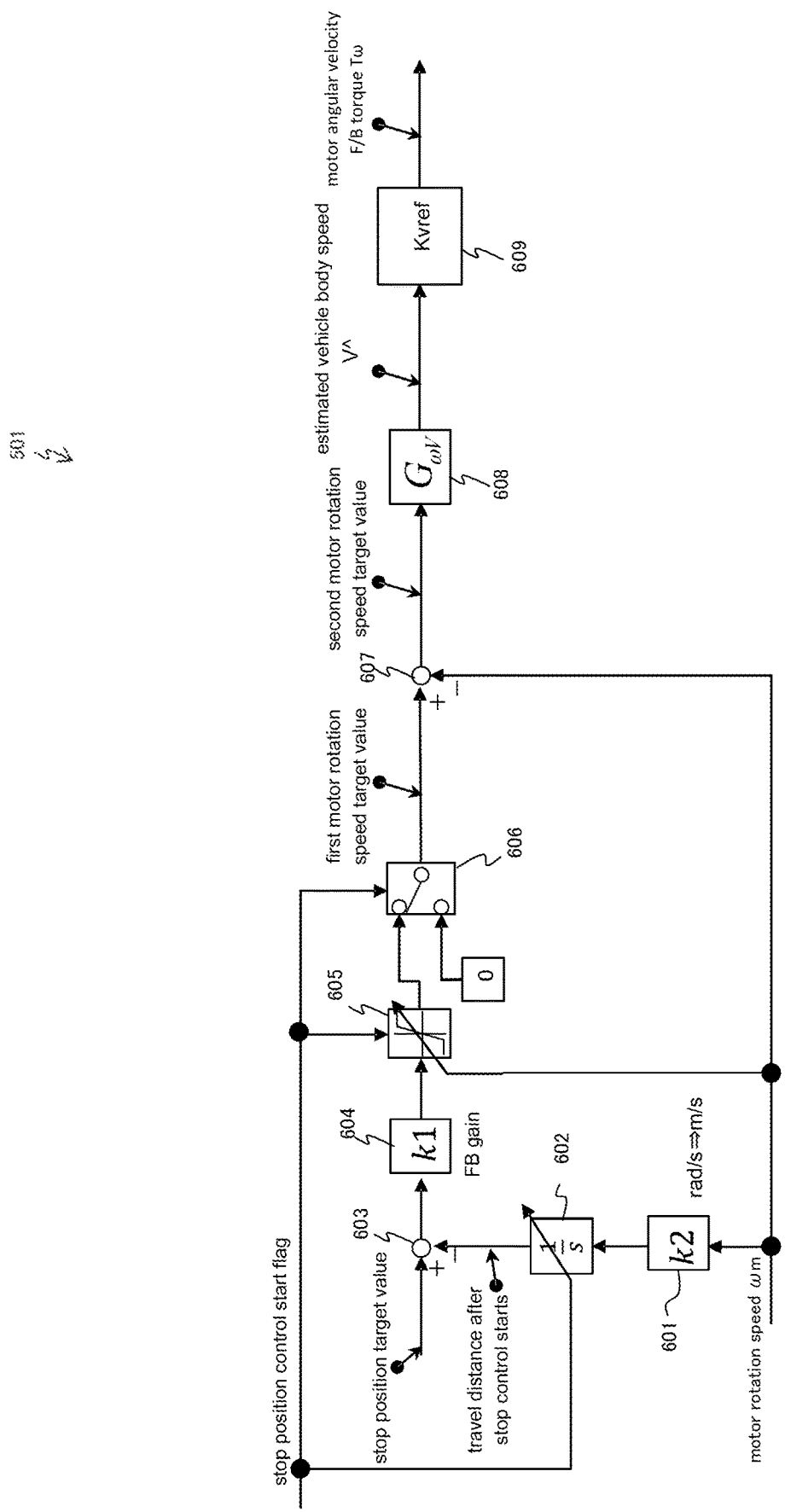
FIG. 7 is a view for describing a method for calculating a motor angular velocity F/B torque.

FIG. 7 is a diagram for explaining how the motor angular velocity F/B torque setter 501 calculates the motor angular velocity F/B torque Tω.

The motor angular velocity F/B torque setter 501 includes a unit converter 601, an integrator 602, subtractors 603, 607, multipliers 604, 609, an upper and lower limit 605, a rotation speed switcher 606, and a control block 608.

The unit converter 601 performs unit conversion (rad/s→m/s) by multiplying the motor rotation speed ωm by the gain k2.

The integrator 602 calculates a travel distance after the start of stop control by performing an integral process on the motor rotation speed ωm which has been unit-converted by the unit converter 601. Further, the integrator 602 is initialized when the stop position control start flag changes from 0 to 1.

The subtractor 603 calculates the deviation between the target stop position and the travel distance after the start of stop control. The calculated deviation is input to the multiplier 604.

The multiplier 604 calculates the rotation speed according to the deviation by multiplying the input deviation by the gain k1.

The upper and lower limit 605 applies the upper and lower limit to the rotation speed calculated by the multiplier 604. The motor rotation speed when the stop control start flag changes from 0 to 1 may be set as the upper limit value. Further, the lower limit value may be set to 0 in order to prevent the vehicle from moving backward.

The rotation speed switcher 606 calculates the first motor rotation speed target value by performing the rotation speed switching process on the rotation speed output from the upper and lower limit 605 according to the state of the stop control start flag. When the stop control start flag is 1, the rotation speed output from the upper and lower limit 605 is set to the first motor rotation speed target value. When the stop control start flag is 0, the first motor rotation speed target value is set to 0.

The subtractor 607 calculates the deviation between the first motor rotation speed target value and the motor rotation speed ωm, and calculates the second motor rotation speed target value. The calculated second motor rotation speed target value is input to the control block 608. Further, the positions of + and − shown in the vicinity of the subtractor 607 in the figure may be interchanged and may be set as appropriate.

The control block 608 functions as a filter that simulates or approximates the transmission characteristic Gωv(s) of the above equation (13), that is, a filter having the transmission characteristic Gωv (s). Therefore, the control block 608 calculates the estimated vehicle body speed V^ indicating the estimated value of the vehicle body speed V by inputting the motor rotation speed ωm and performing a filtering process in consideration of the transmission characteristic Gωv(s).

Note that the transmission characteristic Gωv(s) of equation (13) can be approximated as in the following equation (15).

[Equation 15]

$$G'_{\omega V}(s) = \frac{c'_0}{(s + \tau_{\omega V})} \quad (15)$$

Therefore, the control block 608 may perform a filtering process using the transmission characteristic Gωv'(s) of equation (15) instead of the transmission characteristic Gωv (s) of equation (13). Thus, arithmetic processing can be reduced as compared with the case of using the transmission characteristic Gωv(s) of equation (13).

Further, instead of the time constant Tω v in the above equation (15), the pole ωp specified by equation (14) may be used. Thus, it is possible to calculate the estimated vehicle body speed VA using one pole of the denominator of the transmission characteristic from the motor rotation speed ωm to the vehicle body speed V.

Further, instead of the above equation (14), the following equation (16), which expresses a characteristic that approximates the pole a which is far from the origin on the complex plane, may be used.

[Equation 16]

$$G_{pF}(s) = \frac{c_0}{\left(s^2 + 2\zeta_p \omega_p s + \omega_p^2\right)} \quad (16)$$

Further, the control block 608 may be configured to perform a filtering process by the transmission characteristic GωV(s) of the following equation (17) in consideration of the estimated vehicle body speed VA based on the motor rotation speed ωm and the above equation (16) representing the transmission characteristic from the driving force F to the motor torque Tm.

[Equation 17]

$$G_{\omega V}(s) = k \frac{(s+\alpha) \cdot (s^2 + 2\zeta_p \omega_p s + \omega_p^2)}{(s+\beta) \cdot (b_2' s^2 + b_1' s + b_0')} \quad (17)$$

Further, by multiplying the gain k considering the gear ratio and the dynamic radius of the tire, etc. in the above equation (17), the input of the transmission characteristic GωV(s) can be the motor rotation speed ωm, and the output can be the estimated vehicle body speed VA.

Thus, in the multiplier 609, the angular velocity feedback torque Tω is calculated by multiplying the estimated vehicle body speed V^ output from the control block 608 by the gain kvref, wherein it is assumed that a value larger than 0 (kvref>0) is set to be the gain kvref.

Next, the disturbance torque estimator 502 shown in FIG. 6 will be described. The disturbance torque estimator 502 calculates the disturbance torque estimated value Td based on the motor rotation speed ωm and the motor torque command value Tm*. Details will be described using FIG. 8.

Figure 8:
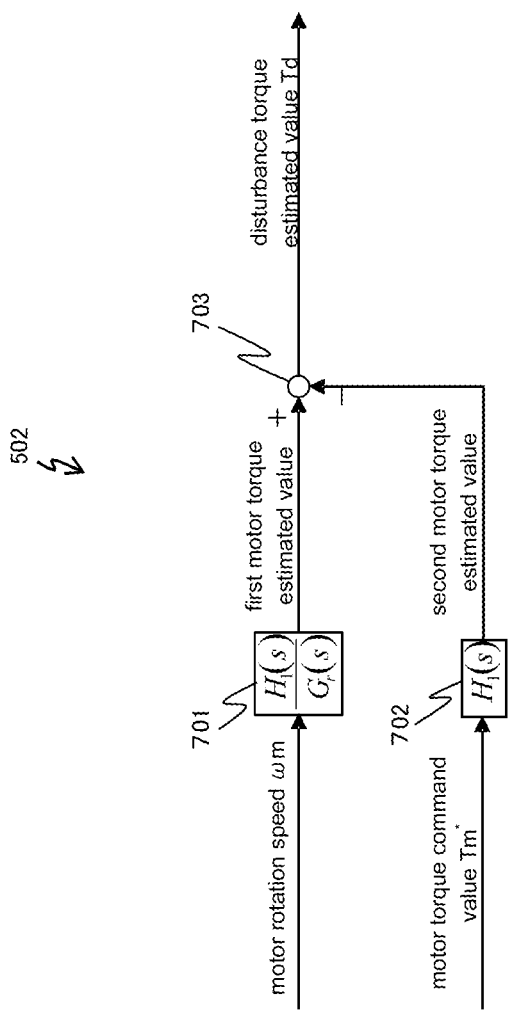
FIG. 8 is a view for describing a method for calculating a disturbance torque estimated value.

FIG. 8 is a diagram for explaining a method of calculating the disturbance torque estimated value Td based on the motor rotation speed ωm and the motor torque command value Tm*.

The disturbance torque estimator 502 includes a control block 701, a control block 702, and a subtractor 703.

The control block 701 functions as a filter having the transmission characteristic of H1(s)/Gr(s), and calculates the first motor torque estimated value by inputting the motor rotation speed ωm and performing a filtering process.

Of the transmission characteristic of the control block 701, Gr(s) constituting the denominator is the transmission characteristic shown in the above equation (10), and is a vehicle model derived from the vehicle model Gp(s) of equation (9) and an algorithm of vibration damping control. Further, H1(s), which constitutes the numerator of the transmission characteristic, is a low-pass filter having a transmission characteristic such that the difference between the denominator order and the numerator order is equal to or greater than the difference between the denominator order and the numerator order of the vehicle model Gp(s).

The control block 702 functions as a filter having the transmission characteristic H1(s), and calculates the second motor torque estimated value by inputting the motor torque command value Tm* and performing a filtering process considering the transmission characteristic H1(s).

The subtractor 703 outputs the deviation between the first motor torque estimated value and the second motor torque estimated value as the disturbance torque estimated value Td. The subtractor 703 of this embodiment calculates the disturbance torque estimated value Td by subtracting the first motor torque estimated value from the second motor torque estimated value.

Further, the disturbance torque estimated value Td in this embodiment is estimated by the disturbance observer shown in FIG. 8, but may also be estimated, for example, using a measuring instrument such as a vehicle front-rear G sensor.

Here, as the disturbance acting on the vehicle, air resistance, modeling error caused by fluctuation of the vehicle mass due to the number of occupants or the load capacity, rolling resistance of the tire, gradient resistance of the road surface, etc. are considered, and gradient resistance is the dominant disturbing factor just before a stop or at an initial start. The disturbance factors differ depending on driving conditions, but the disturbance torque estimator 502 calculates the disturbance torque estimated value Tm* based on the motor torque command value Tm*, the motor rotation speed ωm, and the transmission characteristic Gr(s) derived from the algorithm of the vibration damping control and the vehicle model Gp(s), thereby making it possible to estimate the above disturbance factors collectively. Thereby, under any operating condition, it is possible to achieve a smooth stop from deceleration.

Now back to FIG. 6, the following continues the description. The subtractor 503 calculates the second torque target value Tm2* by adding the motor angular velocity F/B torque Tω from the motor angular velocity F/B torque setter 501 and the disturbance torque estimated value Td from the disturbance torque estimator 502.

The torque compensator 504 determines that the vehicle is about to stop when it determines that the second torque target value Tm2* is larger than the first torque target value Tm1* comparing the first torque target value Tm1* and the second torque target value Tm2* or when the state of the stop control flag calculated by the stop position control start flag setter 1001 is 1, then causes the stop control to be execute by switching the third toque target value Tm3* from the first torque target value Tm1* to the second torque target value Tm2*. Further, the torque compensator 504 determines that the vehicle is not about to stop when it determines that the first torque target value Tm1* is larger than the second torque target value Tm2* or when the state of the stop control flag calculated by the stop position control start flag setter 1001 is 0, then switches the third torque target value Tm3* from the second torque target value Tm2* to the first torque target value Tm1*. Note that in order to maintain a vehicle stop state, the second torque target value Tm2* converges to a positive torque on an ascending road, to a negative torque on a descending road, and to generally zero on a flat road.

Next, details of the vibration damping control process performed in Step S205 of FIG. 2 will be described.

Figure 9:
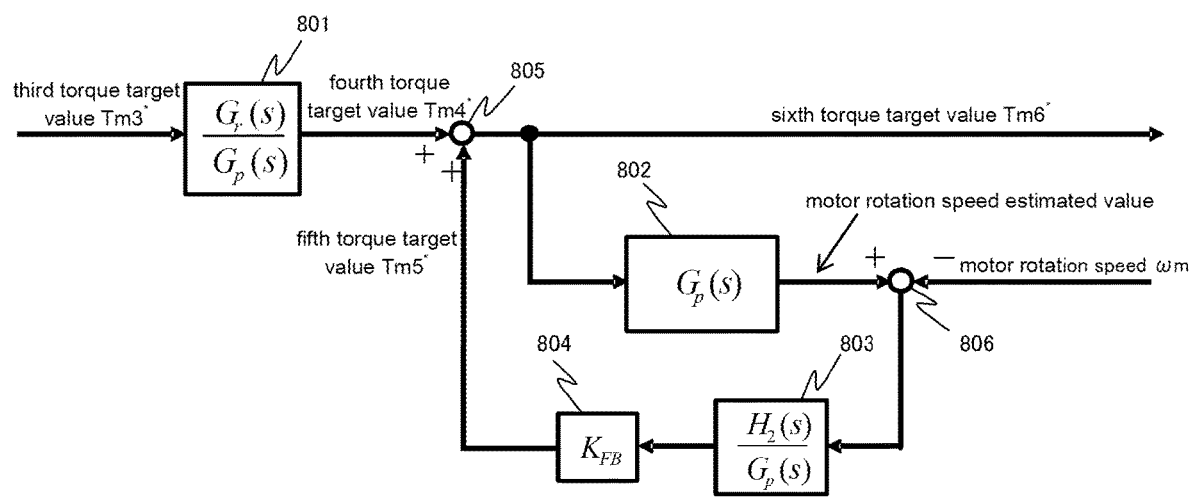
FIG. 9 is a block diagram for implementing a vibration damping control process that suppresses vibration of the driving force transmission system.

FIG. 9 is a block diagram showing an example of a functional configuration for implementing a vibration damping control process that suppresses vibration of the driving force transmission system of electric vehicle. The vibration damping control process is configured of a combination of an F/F compensator and F/B compensators.

FIG. 9 shows a control block 801 as an F/F compensator, and an adder 805, a control block 802, a subtractor 806, a control block 803, and a multiplier 804 as F/B compensators.

The control block 801 functions as a filter having the transmission characteristic of Gr(s)/Gp(s), and calculates the fourth torque target value Tm4* by inputting the third torque target value Tm3* and performing a filtering process of reducing the torsional vibration of electric vehicle.

Of the transmission characteristic of the control block 801, the Gp(s) constituting the denominator is the vehicle model Gp(s) of equation (9), and the Gr(s) constituting the numerator is the vehicle model of equation (10) derived from the vehicle model Gp(s) and the algorithm of vibration damping control.

The adder 805 outputs the sixth torque target value Tm6* by adding the output of the multiplier 804 constituting the F/B compensators to the fourth torque target value Tm4* obtained by feedforward control.

The control block 802 functions as a filter having the vehicle model Gp(s). Therefore, the control block 802 calculates the motor rotation speed estimated value ωm^, which indicates the estimated value of the motor rotation speed ωm, by inputting the sixth torque target value Tm6* and performing a filtering process considering the vehicle model Gp(s).

The subtractor 806 outputs the deviation between the motor rotation speed estimated value ωm^ and the motor rotation speed ωm. The subtractor 806 of this embodiment calculates the deviation by subtracting the motor rotation speed ωm from the motor rotation speed estimated value ωm^.

The control block 803 functions as a filter having the transmission characteristic of H2(s)/Gp(s), and calculates the estimated disturbance d^ indicating the estimated value of the disturbance d by inputting the deviation of the subtractor 806 and performing a filtering process.

Of the transmission characteristic of the control block 803, H2(s), which constitutes the numerator and is a vehicle model derived from the vehicle model Gp(s) of equation (9) and the algorithm of vibration damping control, is a bandpass filter having a transmission characteristic that is a feedback element which reduces only vibration.

The multiplier 804 calculates the fifth torque target value Tm5* taking the control error of the motor rotation speed ωm into account by multiplying the estimated disturbance d^ from the control block 803 by the feedback gain $K_{FB}$. Then, by adding the fifth torque target value Tm5* to the fourth torque target value Tm4* by the adder 805, the motor rotation speed ωm is fed back to the sixth torque target value Tm6* so as to suppress the generation of torsional vibration of the electric vehicle.

Next, the transmission characteristic H2(s) of the control block 803 will be described.

Figure 10:
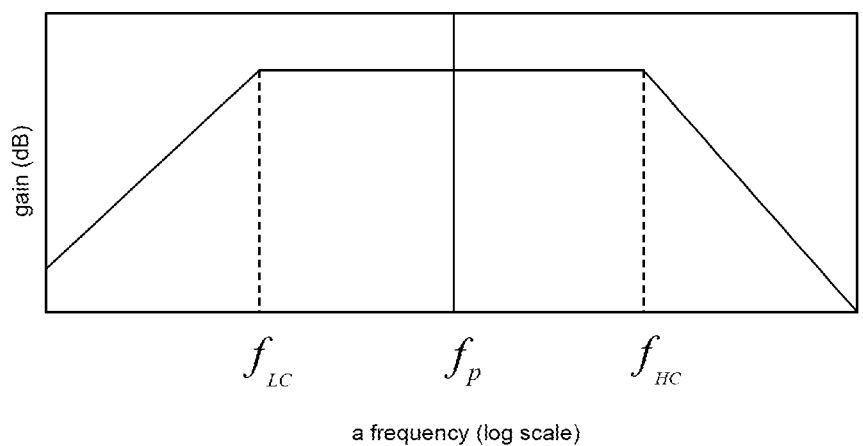
FIG. 10 is a diagram showing an example of the transmission characteristics used in the vibration damping control process.

FIG. 10 is a diagram showing an example of a bandpass filter for implementing the transmission characteristic H2(s).

The transmission characteristic H2(s) is set so that the damping characteristic on the low-pass side and the damping characteristic on the high-pass side are almost the same and the torsional resonance frequency of the driving system is near the center of the passband on the log scale. By setting the characteristics of the filter in this way, the greatest effect can be obtained.

For example, when the transmission characteristic H2(s) is configured using a first-order high-pass filter and a first-order low-pass filter, the transmission characteristic H2(s) is expressed by the following equation (18), the frequency fp is set to the torsional resonance frequency of the driving system, and k is set to an arbitrary value.

[Equation 18]

$$H_2(s) = \frac{\tau_H s}{(1+\tau_H s)\cdot(1+\tau_L s)} \quad (18)$$

Here, $\tau_L = 1/(2\pi f_{HC})$, $f_{HC} = k \cdot f_p$, $\tau_H = 1/(2\pi f_{LC})$, $f_{LC} = f_p/k$.

Further, since torsional vibration occurs in the driving force transmission system of the electric vehicle in this embodiment, the stop control and the vibration damping control are used in combination, but for electric vehicles that do not generate torsional vibration in the driving force transmission system, it is not necessary to execute the vibration damping control process of Step S205.

Figure 11:
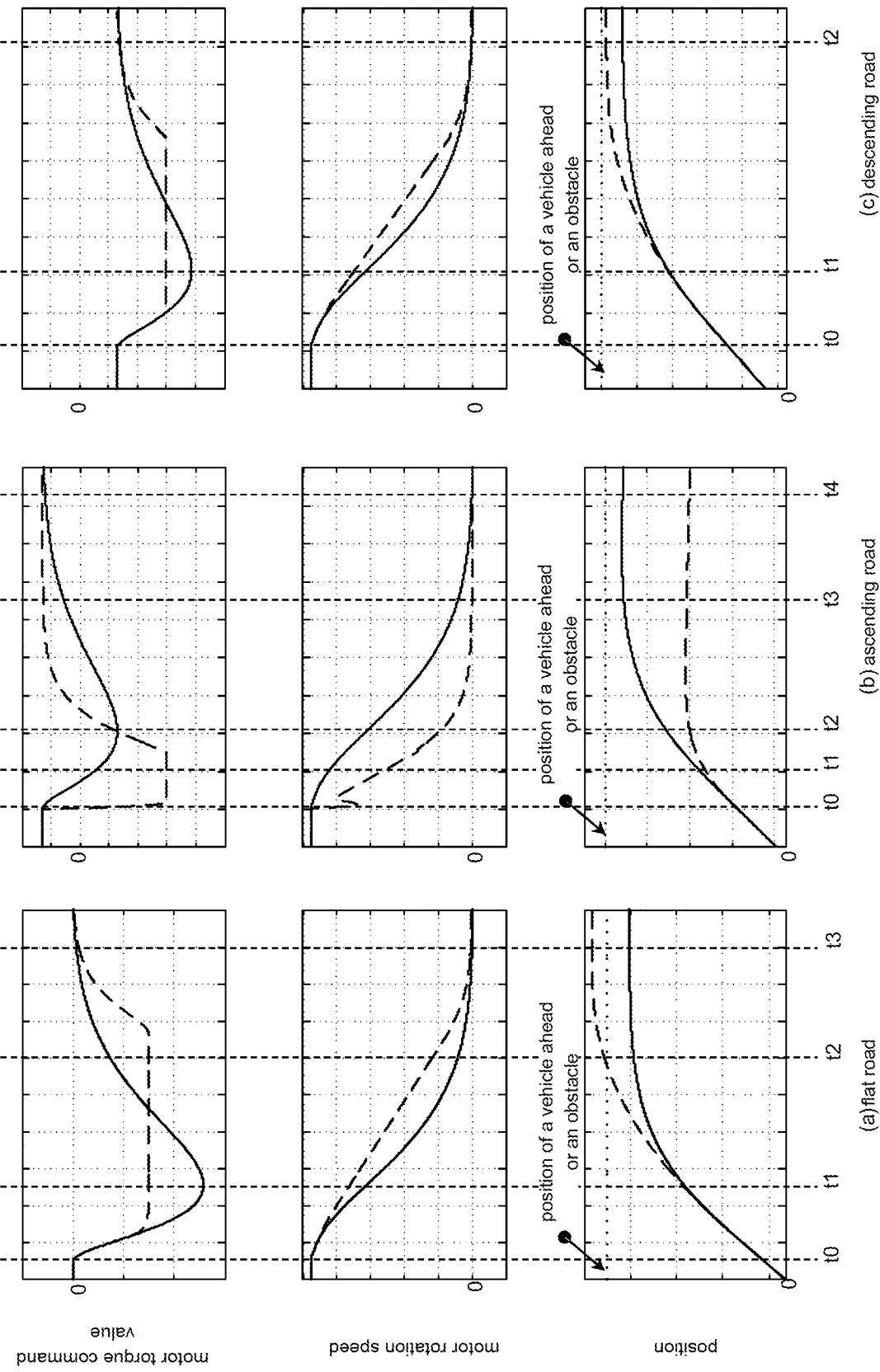
FIG. 11 is a time chart showing one example of a control result by the control device for the electric vehicle of this embodiment and one example of a control result by a conventional control.
Figure 12:
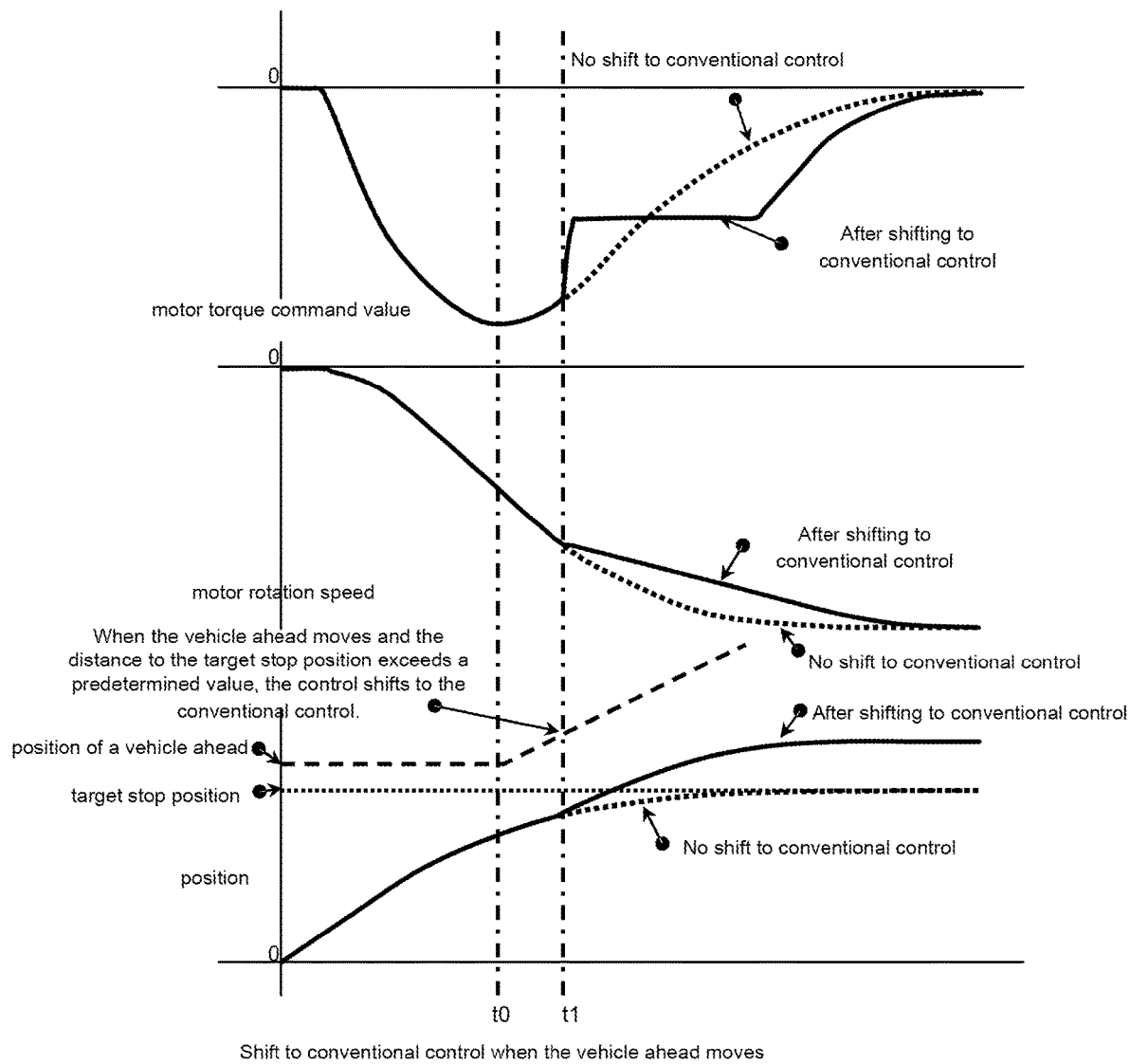
FIG. 12 is a time chart showing another example of a control result by the control device for the electric vehicle of this embodiment.

Hereinafter, the effect of applying the control device of the electric vehicle in this embodiment to the electric vehicle will be described with reference to FIG. 11 and FIG. 12. FIG. 11(*a*) shows the time chart when a stop control is executed on a flat road, FIG. 11(*b*) show it on an ascending road, and FIG. 11(*c*) shows it on a descending road. In each case, the broken line represents the conventional stop control (conventional example), and the solid line represents the stop control of this embodiment (example). Further, FIG. 12 shows a time chart in the case of shifting to the conventional example when the vehicle ahead moves during the stop control of this embodiment. In addition, both FIG. 11 and FIG. 12 show the motor torque command value, motor rotation speed, and host vehicle position from the top.

In the conventional example on a flat road shown in FIG. 11(*a*), at time t0, the driver's accelerator opening operation amount becomes zero, and it is determined to be a stop control start, and the motor rotation speed asymptotically converges to zero by the stop control until time t3.

In the conventional example, the regenerative torque is small because the motor torque is uniquely determined regardless of the relative distance to the vehicle ahead or the obstacle. As a result, at time t2, the relative distance to the vehicle ahead or the obstacle becomes 0, indicating that a collision will occur. Thus, in the conventional example, it is hard to stop at the target stop position intended by the driver.

On the other hand, in the embodiment according to the present invention, at time t0, the driver's accelerator opening operation amount becomes zero, and it is determined to be a stop control start and the stop control is started, and the motor regenerative torque can be set large according to the relative distance to the vehicle ahead or the obstacle until time t1, and thus, at time t3, it can be seen that a smooth stop can be achieved while ensuring the relative distance to the vehicle ahead or the obstacle.

In the conventional example on an ascending road shown in FIG. 11(*b*), at time t0, the driver's accelerator operation amount becomes zero, and it is determined to be a stop control start, and the motor rotation speed asymptotically converges to zero by the stop control until time t3.

In the conventional example, the motor regenerative torque is set large at time t1, and thus, the time until the stop of the motor becomes short. Thus, the position when the motor rotation speed converges to zero (the stop position of the host vehicle) is far from the position of the vehicle ahead or the obstacle, and the host vehicle cannot stop at the driver's intended target stop position.

On the other hand, in the embodiment, at time t0, the driver's accelerator opening operation amount becomes zero, and it is determined to be a stop control start and the stop control is started, and the motor regenerative torque can be set small according to the relative distance to the vehicle ahead or the obstacle until time t2, and thus, at time t4, it can be seen that a smooth stop can be achieved while ensuring the relative distance to the vehicle ahead or the obstacle.

In the conventional example on a descending road shown in FIG. 11(*c*), at time t0, the driver's accelerator operation amount becomes zero, and it is determined to be a stop control start, and the motor rotation speed asymptotically converges to zero by the stop control until time t2.

In the conventional example, the motor torque is uniquely determined regardless of the relative distance to the vehicle ahead or the obstacle, and thus, the regenerative torque is small, and at time t2, the relative distance to the vehicle ahead or the obstacle is close to 0, indicating that there is a risk of collision. Thus, in the conventional example, it is hard to stop at the target stop position intended by the driver.

On the other hand, in the embodiment, at time t0, the driver's accelerator opening operation amount becomes zero, and it is determined to be a stop control start and the stop control is started, and the motor regenerative torque can be set large according to the relative distance to the vehicle ahead or the obstacle until time t1, and thus, at time t2, it can be seen that a smooth stop can be achieved while ensuring the relative distance to the vehicle ahead or the obstacle.

Thus, according to the embodiment of the present invention, the host vehicle can be stopped at the stop position intended by the driver, that is, the target stop position.

FIG. 12 shows the behavior when the vehicle ahead moves during the stop control according to this embodiment. Further, the solid line from time t1 shows the behavior when shifting to the conventional stop control, and the broken line from time t1 shows the behavior when not shifting to the conventional stop control.

Further, in the case of shifting to the conventional stop control during the stop control according to this embodiment, the value of the first motor rotation speed target value (target angular velocity) may be set to zero, and more specifically, by setting the output of the rotation speed switcher 606 of the aforementioned motor angular velocity F/B torque setter 501 to zero during the stop control, it is possible to shift to the conventional stop control that converges the torque of the motor 4 to the disturbance torque as the motor rotation speed decreases without considering the target stop position.

In the figure, the vehicle ahead starts moving at time t0. Thus, because the distance between the target stop position and the vehicle ahead has exceeded a predetermined value at time t1, the control has shifted to the conventional stop control in which the target stop position is not set. In this way, by shifting to the conventional stop control at the time t1 and making the deceleration equivalent to the conventional example, it is possible to stop the vehicle without causing discomfort to the driver with respect to the position of the vehicle ahead after the movement.

Thus, by applying this embodiment, the vehicle can be smoothly stopped at the target stop position according to the relative distance to the vehicle ahead or the obstacle.

As described above, the control method of the electric vehicle of one embodiment is a control method of an electric vehicle in which the motor is used as a traveling drive source and the vehicle is decelerated by the regenerative braking force of the motor 4. This control method includes: obtaining an accelerator operation amount; estimating a disturbance torque acting on a vehicle body of an electric vehicle; obtaining an angular velocity (motor rotation speed $\omega m$) of a rotating body that correlates to a rotation speed of the drive shaft 8 that drives the electric vehicle; calculating a first torque command value (first torque target value Tm1*) based on the accelerator operation amount; setting the first torque command value to a torque command value (motor torque command value Tm*); controlling a torque generated in the motor 4 based on the torque command value; setting the target stop position at the time of stopping the electric vehicle; calculating the target angular velocity (first motor rotation speed target value) of the rotating body according to the distance from the electric vehicle to the target stop position; and calculating a second torque command value (second torque target value Tm2*) for stopping the electric vehicle at the target stop position based on the difference between the target angular velocity and the obtained angular velocity. Then, converging the torque command value to the disturbance torque Td by setting the second torque command value to the torque command value and adjusting the braking and driving forces of the motor 4 according to a distance to the target stop position, when the accelerator operation amount decreases or becomes zero and the electric vehicle is about to stop.

Thereby, it is possible to calculate the target angular velocity according to the distance to the target stop position and control the motor torque according to the target angular velocity, and thus, it is possible to stop the host vehicle at the position desired by the driver.

Further, according to the control method of the electric vehicle of one embodiment, the target stop position is calculated by subtracting a predetermined distance from the relative distance between the electric vehicle and the vehicle or the obstacle existing in the traveling direction of the electric vehicle. Thereby, the target stop position is set according to the inter-vehicle distance to the vehicle ahead, and thus, for example, even when the deceleration of the vehicle ahead increases, the possibility of colliding with the vehicle ahead at the time of stopping the vehicle can be reduced. Further, by being controlled in this way, the need for the driver to depress the brake pedal is reduced, and thus, the drivability is improved and the commercial value of the vehicle can be enhanced. In addition, by calculating the target stop position by subtracting a predetermined distance from the relative distance to the vehicle or the obstacle, it is possible to stop the vehicle while keeping a certain distance to the vehicle ahead or the obstacle.

Further, according to the control method of the electric vehicle of one embodiment, the above-mentioned predetermined distance is the target value of the relative distance between the electric vehicle and the vehicle or the obstacle existing in the traveling direction of the electric vehicle at the time of stopping the electric vehicle, and is set by a driver in a changeable manner. This allows the driver to arbitrarily change the distance from the host vehicle to the vehicle ahead or the obstacle at the time of stopping the vehicle.

Further, according to the control method of the electric vehicle of one embodiment, the relative distance between the electric vehicle and the vehicle or the obstacle existing in the traveling direction of the electric vehicle is detected using a sensor, a radar, or the camera 10 that can measure the distance. Thereby, the relative distance to the host vehicle can be detected, and thus, the target stop position can be calculated based on the detected relative distance.

Further, according to the control method of the electric vehicle of one embodiment, the control method includes: determining that the vehicle is about to stop and switching the torque command value (motor torque command value Tm*) from the first torque command value (first torque command value Tm1*) to the second torque command value (second torque command value Tm2*), when the relative distance between the electric vehicle and the vehicle or the obstacle existing in the traveling direction of the electric vehicle drops to or below a predetermined value. Thereby, after decelerating according to the first torque target value Tm1*, the motor torque command value Tm* switched to the second torque target value Tm2* for stopping the vehicle at the target stop position is converged to the disturbance torque, and thus, it is possible to realize always smooth deceleration without acceleration vibration, and it is possible to stop the vehicle at the target stop position.

Further, according to the control method of the electric vehicle of one embodiment, the control method includes: comparing the magnitudes of the first torque command value and the second torque command value; and switching the torque command value (motor torque command value Tm*) from the second torque command value (second torque command value Tm2*) to the first torque command value (first torque command value Tm1*), when the first torque command value is larger than the second torque command value. Thereby, the torque target command value is switched from the second torque target value Tm2* that stops the vehicle at the target stop position to the first torque target value Tm1* that is calculated according to the accelerator operation amount, and thus, it is possible to travel according to the driver's request.

Further, according to the control method of the electric vehicle of one embodiment, the control method includes: setting the target angular velocity to zero, when the accelerator operation amount decreases or becomes zero and when the target stop position and the position of the vehicle or the obstacle are separated by a predetermined distance or more due to the movement of the vehicle or the obstacle existing in the traveling direction of the electric vehicle when the vehicle is about to stop. Thereby, it is possible to shift to the conventional stop control, which converges the torque of the motor 4 to the disturbance torque as the motor rotation speed decreases without considering the target stop position, from the stop control of this embodiment which stops the electric vehicle at the target stop position. As a result, since the target stop position is maintained at the target stop position set before the vehicle ahead moves, it is possible to avoid the situation where the vehicle is stopped at a position that is too far from the vehicle ahead, and thus, the vehicle can be stopped without causing discomfort to the driver.

Further, according to the control method of the electric vehicle of one embodiment, a predetermined limit value is applied to the target angular velocity (output value of the multiplier 604). Thereby, it is possible to prevent the motor torque command value Tm* from changing drastically at the time of stop control start.

While the embodiments of the present invention have been described above, the above-described embodiments only show part of application examples of the present invention and are not intended to limit the technical scope of the present invention to the specific configurations of the above-described embodiments.

For example, the motor rotation speed ωm used in the above-mentioned various operations may be an angular velocity of a rotating body having a correlation with the rotation speed of the drive shaft 8 for driving the electric vehicle, and may be appropriately changed. For example, as the parameters used for the above-mentioned various operations, the wheel speed or vehicle body speed, the rotation speed of the drive shaft, or the like may be used instead of the motor rotation speed ωm.

The invention claimed is:

1. A control method for an electric vehicle which includes a motor as a traveling drive source and a controller configured to decelerate the electric vehicle by controlling a regenerative braking force of the motor, comprising using the controller to:
   obtain an accelerator operation amount;
   obtain an angular velocity of a rotating body that correlates to a rotation speed of a drive shaft which drives the electric vehicle;
   calculate a first torque command value based on the accelerator operation amount;
   set the first torque command value to a torque command value;
   control a torque generated in the motor based on the torque command value;
   set a target stop position at the time of stopping the electric vehicle;
   calculate a target angular velocity of the rotating body according to a distance from the electric vehicle to the target stop position;
   calculate a second torque command value for stopping the electric vehicle at the target stop position based on a difference between the target angular velocity and the obtained angular velocity; and
   set the second torque command value to the torque command value and adjust the braking and driving forces of the motor according to a distance to the target stop position, when the accelerator operation amount decreases or becomes zero and the electric vehicle is about to stop.

2. The control method for the electric vehicle according to claim 1, comprising using the controller to:
   estimate a disturbance torque acting on a vehicle body of the electric vehicle; and
   converge the torque command value to the disturbance torque by setting the second torque command value to the torque command value and adjusting the braking and driving forces of the motor.

3. The control method for the electric vehicle according to claim 1, wherein:
   the target stop position is calculated by subtracting a predetermined distance from a relative distance between the electric vehicle and a vehicle or an obstacle existing in a traveling direction of the electric vehicle.

4. The control method for the electric vehicle according to claim 3, wherein:
   the predetermined distance is a target value of a relative distance between the electric vehicle and the vehicle or the obstacle existing in the traveling direction of the electric vehicle at the time of stopping the electric vehicle, and is set by a driver in a changeable manner.

5. The control method for the electric vehicle according to claim 3, wherein:
   the relative distance between the electric vehicle and the vehicle or the obstacle existing in the traveling direction of the electric vehicle is detected using a sensor, a radar, or a camera that can measure a distance.

6. The control method for the electric vehicle according to claim 1, comprising using the controller to:
   determine that the vehicle is about to stop and switching the torque command value from the first torque command value to the second torque command value, when the relative distance between the electric vehicle and the vehicle or the obstacle existing in the traveling direction of the electric vehicle drops to or below a predetermined value.

7. The control method for the electric vehicle according to claim 6, comprising using the controller to:
   compare the magnitudes of the first torque command value and the second torque command value; and
   switch the torque command value from the second torque command value to the first torque command value, when the first torque command value is larger than the second torque command value.

8. The control method for the electric vehicle according to claim 1, comprising using the controller to:
   set the target angular velocity to zero, when the accelerator operation amount decreases or becomes zero and when the target stop position and a position of the vehicle or the obstacle are separated by a predetermined distance or more due to the movement of the vehicle or the obstacle existing in the traveling direction of the electric vehicle when the vehicle is about to stop.

9. The control method for the electric vehicle according to claim 1, wherein:

a predetermined limit value is applied to the target angular velocity.

10. The control method for the electric vehicle according to claim 1, wherein:
the controller is configured to control acceleration and deceleration or stop of the electric vehicle only by operation of an accelerator pedal.

11. A control device for an electric vehicle which includes a motor and a controller configured to decelerate the electric vehicle by controlling a regenerative braking force of the motor, wherein:
the controller is configured to
obtain an accelerator operation amount;
obtain an angular velocity of a rotating body that correlates to a rotation speed of a drive shaft which drives the electric vehicle;
calculate a first torque command value based on the accelerator operation amount;
set the first torque command value to a torque command value;
control a torque generated in the motor based on the torque command value;
set a target stop position at the time of stopping the electric vehicle;
calculate a target angular velocity of the rotating body according to a distance from the electric vehicle to the target stop position;
calculate a second torque command value for stopping the electric vehicle at the target stop position based on a difference between the target angular velocity and the obtained angular velocity; and
set the second torque command value to the torque command value and adjust the braking and driving forces of the motor according to a distance to the target stop position, when the accelerator operation amount decreases or becomes zero and the electric vehicle is about to stop.

* * * * *